United States Patent
Knauer

[11] B 3,982,158
[45] Sept. 21, 1976

[54] POWER DISTRIBUTION CONTROL SYSTEM

[75] Inventor: Wolfgang Knauer, Malibu, Calif.

[73] Assignee: Hughes Aircraft Company, Culver City, Calif.

[22] Filed: July 15, 1974

[21] Appl. No.: 488,634

[44] Published under the second Trial Voluntary Protest Program on January 20, 1976 as document No. B 488,634.

[52] U.S. Cl. .................................. 317/9 R; 317/50
[51] Int. Cl.² ......................................... H02H 3/00
[58] Field of Search ............. 317/9 R, 9 AC, 11 C, 317/16, 38 R, 50, 27 R

[56] References Cited
UNITED STATES PATENTS
3,764,851   10/1973   Hicks et al. ...................... 317/11 C Primary Examiner—J. D. Miller
Assistant Examiner—Harry E. Moose, Jr.
Attorney, Agent, or Firm—Richard J. Rengel; Allen A. Dicke; William H. MacAllister

[57] ABSTRACT

A system control arrangement for power distribution is disclosed in which a line current exceeding a predetermined threshold level is detected as a potential fault current and initiates comparison of the line current and a projected, simulated fault current in a time interval of less than 100 microseconds. The control system responds to a line current exceeding the threshold level to begin a control cycle by opening fast-acting breakers or, inline breakers that switch the current path to a crossed-field switch tube of a current limiting circuit and the control system responds to line current exceeding the simulated fault current over a time period of 1 millisecond to open the current path through the switch tube and thereby insert the current limiting impedance after the millisecond, monitoring time period.

18 Claims, 6 Drawing Figures

POWER DISTRIBUTION CONTROL SYSTEM

BACKGROUND OF THE INVENTION

The field of the invention is fault sensing and control of power distribution systems. More particularly, the preferred embodiment of the present invention is directed to reducing the time period of fault sensing and control of impedance insertion, i.e. to provide for impedance insertion in series in the faulted line before fault currents reach unmanageable or destructive amplitudes.

In some power distribution systems, the short circuit current capability has steadily grown to the point that existing station equipment, in particular the circuit breaker is marginal or inadequate in its fault current ratings. The cause of this trend is primarily the continuing increase in power consumption per unit area. However, the problem is compounded by the requirements of system security which have prompted stiff ties to neighboring systems and multiple parallel transmission lines within each system. There are a number of convincing arguments that the growth in short circuit capability occurs at a geometric rate. This factor combined with increased installation costs and lengthened lead times for procurement of new equipment present a strong case for current limiting devices as an alternative to the historic approach of replacement and upgrading of breakers as their ratings are surpassed.

Various devices have been utilized to limit fault current duty. These include resonant L-C links, saturable reactors and at low voltages, static breakers using force-commutated thyristors. The above devices have individual advantages and disadvantages, but all share in common the disadvantage of significant power losses while operating with normal load. In addition, these arrangements utilizing reactive elements tend to be quite bulky and introduce to the system additional problems from transient overvoltages or harmonic currents.

The insertion during the fault of a resistive element in series with a bus or feeder has certain attractive advantages, but requires rapid response and sophisticated sensing and control. In order to be effective, the device should be capable of inserting the current limiting resistor into the transmission line within about one millisecond of the occurrence of the fault. Further, owing to the extensive interconnection common within many systems, operation at transmission voltages, 138 kV and higher, is desirable. Accordingly, rapid response to fault conditions is needed for fast-acting circuit breakers or impedance insertion devices.

Until recently, devices were not available which were capable of both rapid response and operation at sufficiently high voltage to make current limiting by resistor insertion in transmission lines practical. During the past year, tests have demonstrated the practicality of interrupting high voltage direct current (HVDC) lines at the 100 kilovolt, (kV), 1 kiloampere (kA) level in times as short as two milliseconds. Tests on improved models of this apparatus have been carried forward to 5 kA, still retaining the 100 kV modular unit size. In addition, opening times as short as one millisecond have been achieved on prototype mechanical switches suitable to the current and voltage levels required. Power distribution systems providing current limiting by resistor insertion of the preferred type are disclosed in U.S. Pat. Nos. 3,611,031, 3,641,358, 3,660,723, 3,657,607, 3,777,179, 3,781,606, and Re. 27,557 having a common assignee and are incorporated here by reference; and preferred current interrupters of the crossedfield switch tube type which can be turned off without reducing current to zero and thereby can transfer the current into a parallel resistor are cited infra.

Resistor insertion type ac current limiting devices rated for 138 kV, 10 kA interrupt capacity and based upon the foregoing breaker are disclosed in copending application of the present inventor and William L. Dugan, Ser. No. 488,345 filed July 15, 1974, entitled "Impedance Sensing System and In Line Device Therefor" assigned to the common assignee and incorporated herein by reference.

Prior methods of fault sensing, e.g. measuring rms value of the fault current, require a long sensing period including several periods of an alternating current (ac) cycle which is on the order of tens of milliseconds (ms). The prior methods are suitable for conventional circuit breakers that require at least two cycles for contact opening and arc interruption of the breaker but are not suitable for fast-acting breakers or impedance insertion devices.

In the prior method of fault sensing, the circuit breaker is tripped when the measured rms value exceeds a predetermined critical level. Obviously, sensing in a shorter time period than the time interval of an ac cycle cannot be accomplished directly and the rms value must be inferred by projection of an initial fault current build-up. A further complication in this procedure of projection is that faults can start at any time within the ac cycle.

Recent developments in electrical power breakers include one-cycle and synchronous breakers and also current limiting breakers. These recently developed breakers are dependent upon very short time intervals for fault sensing to utilize their improved capabilities, i.e. sensing time intervals of less than a millisecond to a few milliseconds.

SUMMARY OF THE INVENTION

One method of projecting rms fault current to minimize sensing time, is to sample the current and feed the current samples to digital data analyzer to project an anticipated fault current wave. Should the projected amplitude exceed a predetermined critical level, the breaker is operated. Although feasible, the digital analyzer involves undue sensor complexity.

The preferred embodiment of the present invention is directed to a simpler control system arrangement than the DDA projection method wherein the sensing and decision making process is almost completely analog. When a power fault is detected, preferably within 100 microseconds ($\mu$sec) of the arrival of the wave of surge current, a network simulator is activated to generate a simulated fault condition in phase with the line fault.

The network simulator, according to the preferred embodiment, comprises a low voltage, 60 Hz generator connected in-series with a coil and load resistor corresponding to the reluctance and resistance respectively, of the load impedance. Fault simulation is initiated by short circuiting the load resistor whereupon the current through the coil simulates a reference fault condition of the desired degree of intensity in the power distribution system wherein the line inductance determines the extent of fault current. The simulated fault current provides a reference and both reference fault current and transformer sampled fault current are supplied to a differential amplifier, for example, for comparison. Preferably, the output of the differential amplifier is integrated, and an actual fault current exceeding the reference current throughout the sensing period is predetermined to be sufficiently severe to require a current limiting operation.

Accordingly, an object of the present invention is to provide for control of a power distribution system for limiting fault currents.

Another object is the provision of method and apparatus for rapid fault current sensing and control of fast acting circuit breaker or current limiting device.

A further object is to provide for sensing and decision making on faults in an analog process.

Other objects and features of the invention will become apparent to those skilled in the art as disclosure is made in the following detailed description of preferred embodiments of the invention.

DETAILED DESCRIPTION OF THE PREFERRED EMBODIMENT

Figure 1:
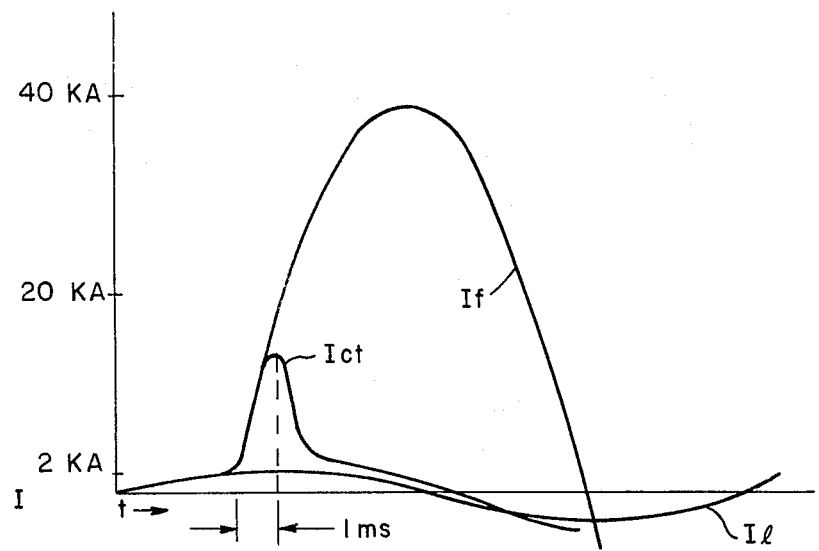
FIG. 1 is a graph for illustrating typical load current, fault current, and limited current of a preferred resistor type of current limiter as provided by the present invention.

Referring now to the drawings, wherein like reference characters refer to corresponding parts throughout the several views there is shown in FIG. 1, a timing diagram showing a typical load current for a power distribution system, for example, a distribution system including two bus-ties which are supplied by two separate generators supplying six transmission lines through conventional circuit breakers. A typical short circuit current illustrated for such an arrangement can reach 40 kiloamperes (kA) for a symmetrical fault as compared to 2 kA of normal load current. Interruption of short circuit currents before they reach 10 kA requires early detection for switching in approximately a millisecond. The switching operation includes opening of an inline breaker, e.g. breaker 10, in the current limiting circuit shown in FIG. 2 and transferring the short circuit current to a cross-field switch tube or interrupter which is subsequently turned-off to bypass the current through a parallel current limiting impedance element in the current limiting circuit. Once the current limiting impedance is inserted, the subsequent current level is low, permitting the fault to be cleared, at a current well within the capability of conventional circuit breakers.

Figure 2:
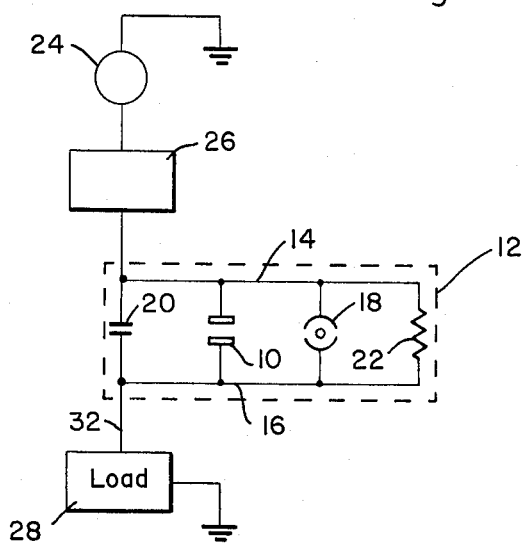
FIG. 2 is a circuit block diagram of a typical power distribution system including the preferred current limiting circuit.

A typical power distribution system for one phase 01 of the current limiting circuit is shown in FIG. 2. The current limiter circuit 12 provides for insertion of impedance 22 into the single phase bus of the ac power distribution system to limit fault current. The value of the impedance reduces the current to a low level to permit the fault to be cleared by opening of the conventional station circuit breakers 26. Until recent developments, devices were not available which were capable of both rapid response and operation at sufficiently high voltage and current to make current-limiting by impedance insertion between current zeros practical in transmission line applications.

Current limiter circuit 12 comprises three major circuit elements connected in parallel between lines 14 and 16. Crossed-field switch device 18 is a cold cathode, glow discharge tube which requires for its conduction an externally applied magnetic field. When this field is turned off, the current between the main electrodes falls to zero in a few microseconds. The interelectrode gap has vacuum insulation properties and easily withstands high voltage. Particular examples of cross-field switch devices are shown in U.S. Pat. No. 3,638,061 of M. A. Lutz and R. C. Knechtli; U.S. Pat. No. 3,641,384 of R. E. Lund and G. A. G. Hofmann; U.S. Pat. Nos. 3,604,977; 3,769,537 of G. A. G. Hofmann; U.S. Pat. No. 3,558,960, G. A. G. Hofmann and R. C. Knechtli; and U.S. Pat. No. 3,678,289 of M. A. Lutz and G. A. G. Hofmann; and are incorporated herein by reference.

Capacitor 20 may be required to limit the rate of voltage rise during resistor insertion. Impedance 22 preferably takes the form of a resistor which consists of Thyrite blocks. These blocks have a resistance characteristic of increasing resistance with decreasing current. The non-linear characteristics of such resistors permit them to reduce the current to normal levels while minimizing the initial voltage surges due to resistor insertion. It is important to sense the fault as early as possible to provide for early resistor insertion.

Figure 2A:
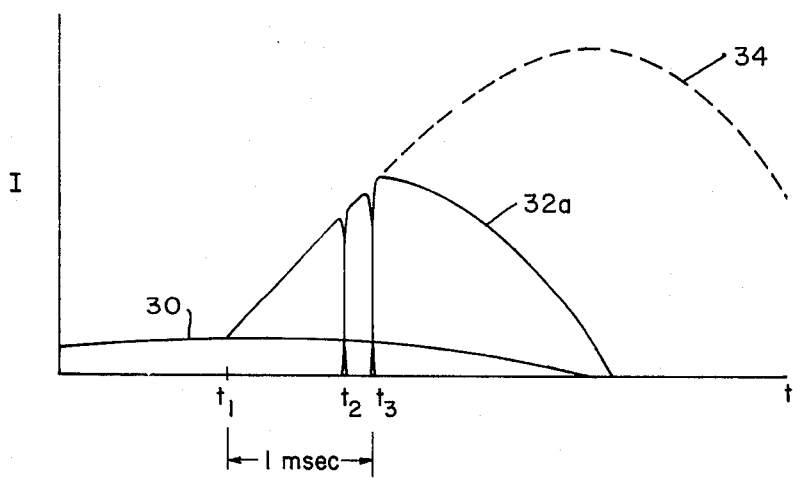
FIG. 2a illustrates the operation of the current limiting device shown in FIG. 2 by a timing diagram having corresponding waveforms of load, fault and impedance limited fault currents.

In operation of the current limiter circuit 12 switch 10 is normally closed and load current is supplied from generator 24 through the conventional station breaker 26, inline limiter circuit 12 to load 28. Normal current is shown at 30 in FIG. 2a. When a fault is detected, switch 10 is opened at t1 and is arcing. Crossed-field switch device 18 is turned on at time t2 to permit quenching and deionization of arc between contacts of switch 10 in the millisecond time period t1–t3. Thereupon, the crossed-field switch 18 is turned-off at time t3 and resistor 22 is inserted to minimize the fault current on line 32, as shown by resistor limited fault current 32a (FIG. 2a) rather than the unrestricted fault current 34. Limited fault current 32a is well within the current handling capacity of the normal system circuit breakers 26.

Figure 3A:
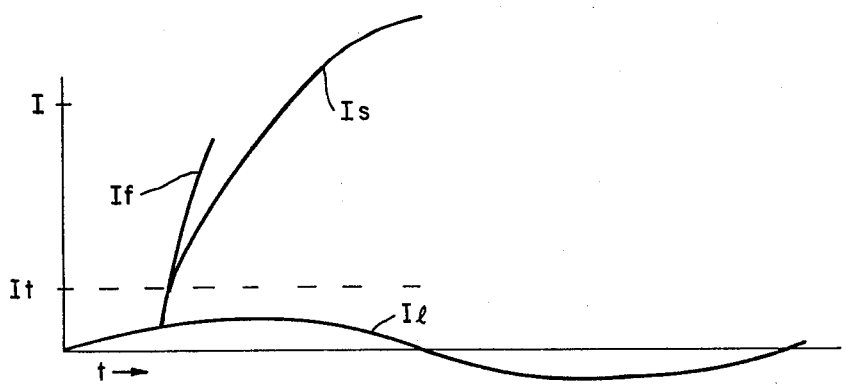
FIG. 3a is a graph showing typical currents including actual fault current, projected, simulated fault current and load current and the current threshold level which is the critical level for initiating a current limiting operating cycle of the present invention.

From the foregoing description of fault protection in the 60 Hz ac power distribution, it should be evident that rapid response time of the control circuit to fault currents is critical in the operation of the protective system. Accordingly, in the preferred embodiment of the invention shown in FIG. 3, the phase 01 control system is shown to comprise fault current detector circuits which are coupled to the power distribution line 32 by a current coupling transformer 36 in order to continually monitor the line current I01. The output of coupling transformer 36 is proportional to di/dt and the transformer output is integrated to provide a load current signal 37 proportional to load current I01. Load current signal 37 is supplied to the Threshold Detector and Trigger Circuits 38, and whenever signal 37 exceeds a predetermined threshold level It over a time period of 50–100 μsec, an output is produced and the trigger circuit is responsive to this output to generate a trigger pulse 39. The threshold level It is set above the normal load current Il as shown in FIG. 3a. A sampling time period of 50–100 μsec is preferred to avoid triggering on lightning surges and other current surges of less than 50 μsec time duration that do not require protective circuit response.

The trigger pulse 39 initiates a fault detection and control operating cycle including (1) actuation at time t1 of inline switch 10 so it is open and arcing to transfer fault or load current at time t2 to crossed-field switch tube 18 which is made conductive at time t2, and (2) initiation of projected or simulated fault current comparison sequence by closing switch S at time t1.

The upper movable contact of switch S closes the contacts in response to trigger pulse 39 to supply a possible fault current signal 37 to differential amplifier D. This signal is for differential comparison with simulated fault current Is supplied to amplifier D in response to closing of lower contacts of switch S. In differential amplifier D, simulated fault current Is is offset by the level of threshold current It by adjustment of Rl. Both simulated and actual fault current signals Is, If are inductive and in quadrature with resistive load current Il as shown by waveforms in FIG. 3a.

The output of differential amplifier D is applied to the input of Fault Detector Circuits 35 which include an integrator circuit for integrating the output of the amplifier D. The integrated output is then applied to detector circuits for detecting the integrated charge to provide an input to a trigger generator, e.g. a Schmitt trigger. The polarity of the integrated charge is detected and an output indicating an actual fault current If exceeding the simulated fault current Is is coupled to the trigger generator to produce an output signal 35a for off switching of switch tube 18 by reduction of its crossed magnetic field below critical. This results in driving the current If through the current limiting resistor 22 to reduce the fault current If to well within the capacity of circuit breakers 26.

Figure 3:
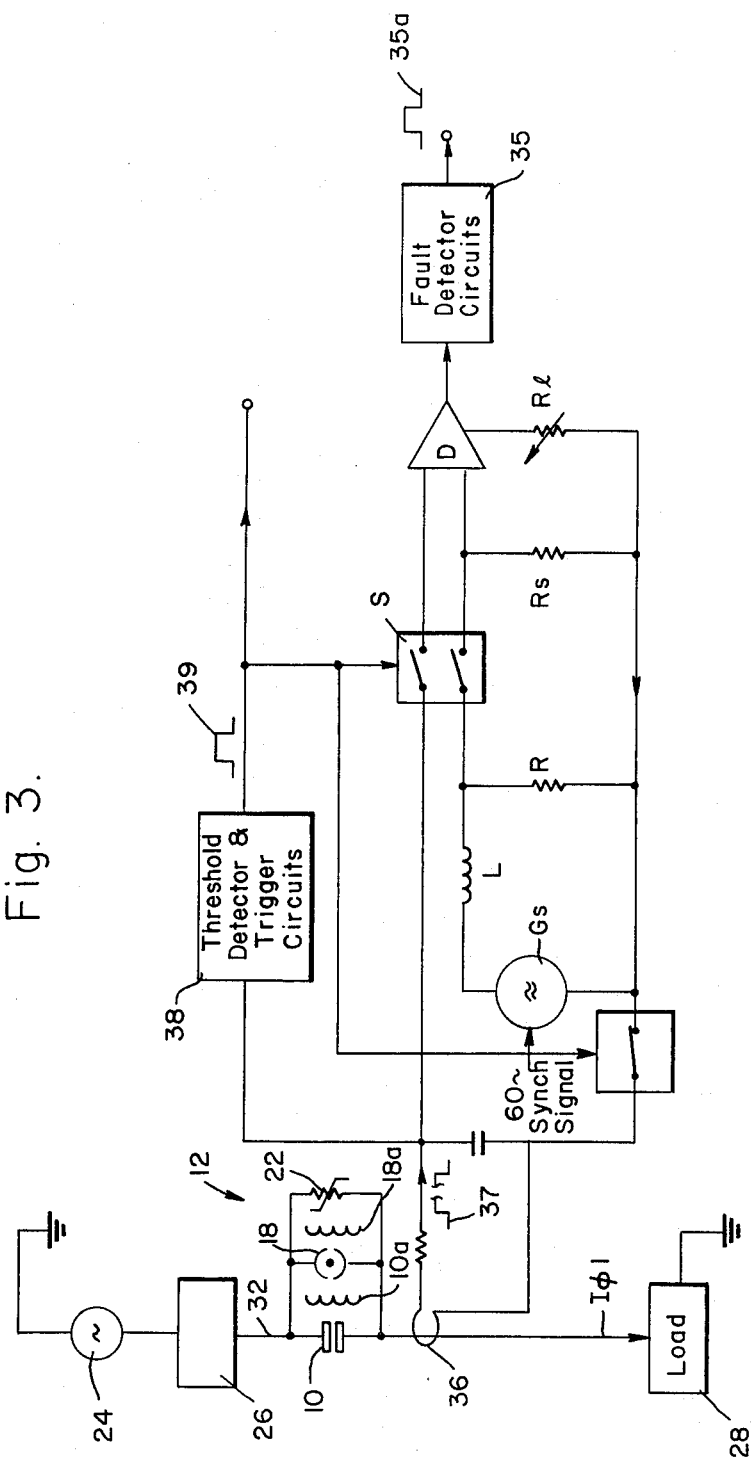
FIG. 3 is a schematic block diagram of the current limiting control system for a single phase 01 of the preferred embodiment of the present invention including the 01 bus and controlled current limiting circuit.

In operation therefore, the control network shown in FIG. 3 provides for sensing fault currents exceeding the predetermined threshold level It and detecting fault currents If continuing to exceed a simulated reference current for approximately 1 msec to complete the current limiting cycle. When the fault is sensed and remains 50–100 microseconds after arrival of the first current surge at the inline breaker 10, for example, the fault simulating network is activated to generate a simulated fault current If in phase with the actual fault current, i.e., in quadrature with the load current Il.

As shown in FIG. 3, the fault simulator network comprises a voltage transformer or a 60 cycle generator, phase-locked to the power distribution system 60 Hz voltage by the 60 Hz synchronous signal and disconnected during fault detection in response to trigger signal 39. A coil L is connected in series and a load resistor R, in shunt to simulate the power system, load impedance. The load impedance circuit therefore, includes the coil L connected in series with the generator Gs at all times and a load resistor R normally in series with the coil L and generator Gs to simulate the load impedance of the power system. Fault simulation is initiated by shunting the load resistor R by resistor Rs, of small resistance relative to load resistor R. Actuation of switch S, closing the lower contacts, completes the simulated fault circuit from the generator Gs through resistor Rs and since the coil L corresponds to the line inductance, the current Is through coil L and resistor Rs then simulates a minimum reference fault current condition in the power distribution system line 32. During a severe fault the line inductance determines or limits the flow of fault current If. By a proper adjustment of the amplitude of the simulated fault current Is, a reference signal is derived, which is supplied to differential amplifier D. A comparison is made in the differential amplifier D between the reference signal and fault current signal 37 and the output of the amplifier is integrated to provide an average output throughout the period of the fault detection cycle. An actual fault current signal 37 exceeding the reference current signal for the 1 msec time period indicates the fault is severe and requires interruption of the power distribution line 32 by the breakers 26.

As noted earlier, the output of the Threshold Detector and Trigger Circuits 38 provides the trigger pulse 39 for operation of switch S to position the movable contacts to close the circuits to the differential amplifier D. While this switch S is closed, load resistor R is shunted by resistor Rs; and since resistor Rs is greatly smaller than resistor R (Rs<<R) and resistor Rs is greatly smaller than the line reactance, ωL (Rs<<ωL), the prevailing load for the generator Gs is the simulated line inductance L whereby the simulated network current rise is the analog of the current in bus 32.

The actual fault current If and simulated current signals are compared in the differential amplifier D which is provided with an offset by the amount which is equal to the threshold level of the threshold detector 38. The offset which is adjustable in parallel with the threshold level It is provided by a variable resistor Rl. The offset places the centerline of the simulated fault current wave and the centerline of the analog line current wave together, so the waves can be compared. Since the threshold point is known, offsetting the simulalted fault wave to the threshold value provides coincidence at that point. As the two waves proceed from that point, comparison can be made. If the analog 37 of the line fault is higher than the simulated fault, then the differential amplifier signals Fault Detector Circuits 35. As noted earlier, the output of the differential amplifier D is fed to the Fault Detector Circuits 35 including an integrator, and at the end of the comparison period of a millisecond, for example, the polarity of the integrated output is detected and measured to determine the severity of the fault whereby the need for insertion of current limiting resistor 22 that is followed by tripping of the breaker 26 is determined.

In the preferred embodiment, the control system is applied to a power distribution system using an inline current limiting circuit 12 and switch tube 18 which in turn is made conductive and nonconductive to shunt the fault current to current limiting resistor 22 before the fault current can rise to an unrestrained, destructive peak. As shown, the current limiter circuit comprises a parallel connection of a mechanical switch or inline breaker 10, electronic interrupter 18, comprising a crossed-field switch tube, and the current limiting resistor 22. The inline breaker 10 carries the normal line currents I01 and when the fault current If is detected, the contacts of the breaker 10 are opened rapidly. Later, the current is transferred to the interrupter 18 which conducts for the time period required to deionize the inline breaker, i.e. approximately 100 microseconds. Subsequently, the interrupter 18 is turned-off by removing the crossed-field and the fault current is shunted through the current limiting resistor 22.

It is important to the preferred mode of operation that the time period from the fault detection to resistor insertion should not exceed approximately in the order of 1 msec, and accordingly, it is important that the control process be completed within this short time interval. In the preferred mode of operation therefore, the line current I01 is monitored continually by the Threshold Detector and Trigger Circuits 38 and whenever the line current exceeds the threshold for a period of 50–100 μsec, the circuits 38 produce the trigger signal 39. The time interval of 50–100 microseconds is preferred to avoid triggering by lightning surges which typically last for a time interval of 10 μsec. As noted earlier, the trigger signal 39 initiates the fault comparison process by the opening of the inline breaker 10 and at the same time initiates the fault current simulation and differential detection in the differential amplifier D during the time period of 1 msec.

After the time period of 1 msec, the integrated output from the differential amplifier D is tested for polarity to determine whether a severe fault current exists. Whenever a severe fault is detected the current limiter device 12 is actuated to complete the resistor insertion by turning on the switch tube 18 to complete the interruption of current via inline breaker 10 and 100 microseconds later turning the switch tube off by internal timing provided in the switch tube or by reducing the magnetic field below critical, as previously described. If it is found that the fault is not sufficiently severe or if the current has returned to normal the inline breaker 10 is simply closed without completing the current limiting cycle.

After the cycle is complete in approximately 1.2 msec, for example, switch S is reset, opening the double pole contacts. The leading edge of trigger pulse 39 sets a monostable multivibrator (one-shot), for example, which one-shot resets in the desired time interval. Another one-shot is responsive to the trigger pulse 39 to provide for resetting, i.e. closing contacts of inline breaker 10 after 1 msec in the desired manner when no fault is detected. Thus, in the absence of output signal 35a, the output of the 1 msec one-shot is gated to close the contacts of inline breaker 10.

Inline breaker contacts are opened by current supplied by a conventional capacitor bank energy storage triggered by a silicon controlled recifier, SCR, or equivalent. Thus, the capacitor bank for inline breakers of the cited prior art are responsive to the trigger pulse 39 to open the contacts and responsive to the gated output of the 1 msec one-shot to close the contacts. The circuit breakers 26 are coupled to current limiting breaker circuit 12 to be responsive to insertion of resistor 22 to open circuit breaker 26.

Figure 4:
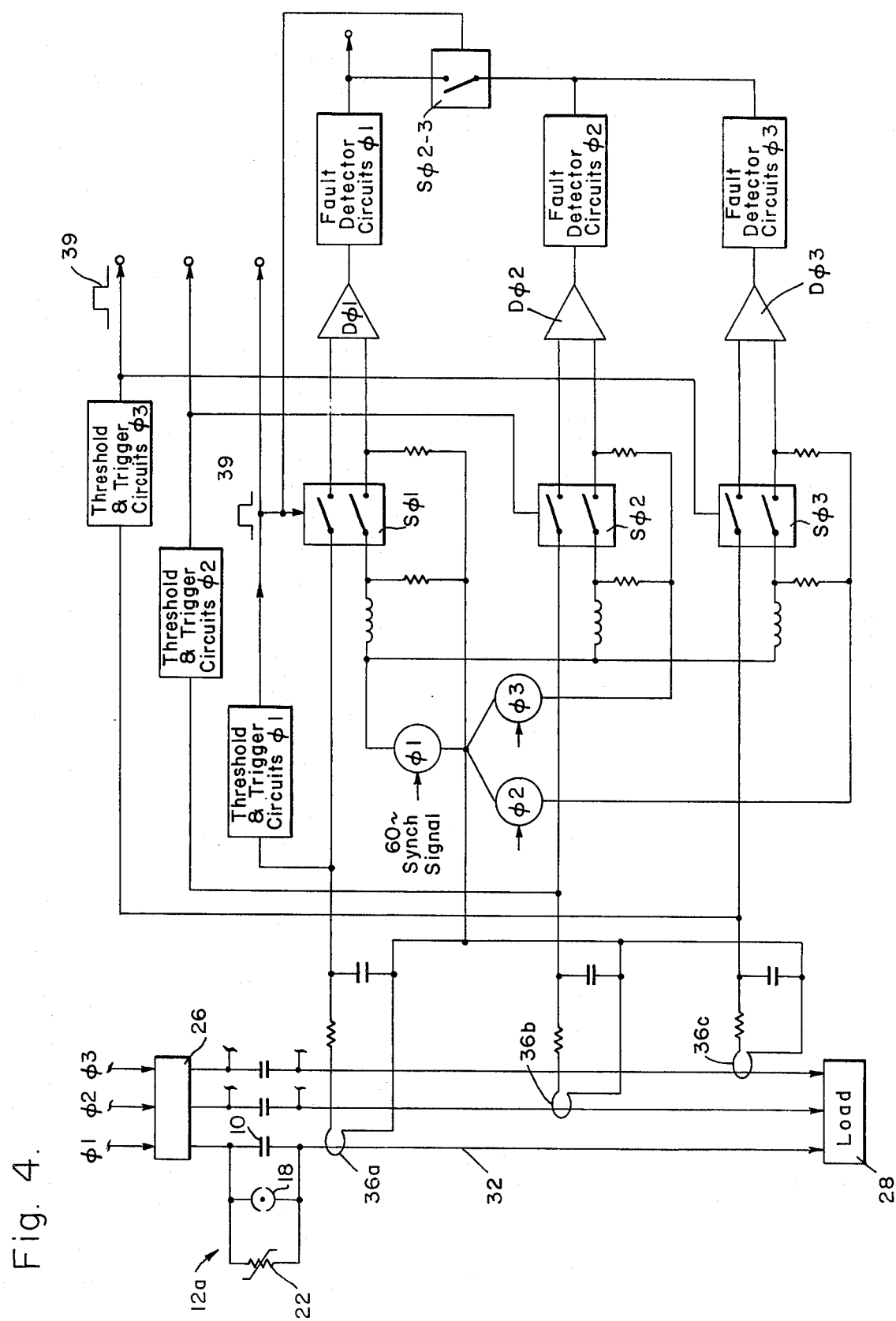
FIG. 4 is a schematic block diagram of the current limiting control system having inputs from three phases 01, 02, 03 to provide phase to phase fault detection in the preferred embodiment of the present invention.

Referring now to FIG. 4, a control system for all possible faults on phase 01 bus of a three phase ac power distribution system is shown. The control system includes individual control circuits for each of the phases 01, 02, 03 to respond to line-to-ground faults and line-to-line faults for phase 01. Since the phase relationship between line-to-ground voltage and fault current for a line-to-ground fault is different than that of a line-to-line fault, additional fault simulation networks for phases 02, 03 have been provided as shown.

The fault simulation network for phase 01 responds to line-to-ground faults on phase 01 while the network for phase 02 responds to line-to-line faults between bus 01 and bus 02, and the network for phase 03 responds to line-to-line faults between bus 01 and bus 03. Switch S 02-3 is actuated by trigger pulse 39, phase 01 which pulse also actuates switch S 01. In order to prevent undue complexity, duplication in the drawings of additional control circuits including simulation networks have not been shown for line-to-ground faults for phases 02, 03 and line-to-line faults between bus 02 and bus 03.

In the light of the above teachings of the preferred embodiment disclosed, various modifications and variations of the present invention are contemplated and will be apparent to those skilled in the art without departing from the spirit and scope of the invention. For example, derivation of the signal input for the control system can be provided by a shunt resistor coupled to the bus 32 instead of the current transformer coupling and integrator circuit combination as shown in FIG. 3, for example. Further, the present invention can be derived from voltage sensing rather than current sensing of fault currents and other signals used in the control circuits. Also, voltage sensing is used to complement the current sensing arrangement for redundancy.

The alternate arrangement of voltage sensing would provide a decrease in line voltage during a fault condition and the amount of decrease determines the degree of the fault. As in the preferred embodiment, the control system must provide for rapid response to a fault condition and therefore sensing intervals must be short in comparison to an ac power cycle, i.e., the ultimate reduction in rms voltage is derived from the initial decrease in voltage which corresponds to the increase in current to the preferred embodiment. Further, in the corresponding voltage sensing and control system, actual voltage transients are compared with those of the simulated fault and the circuit breaker is triggered when the actual transient voltage curve falls below the desired reference voltage curve derived from the voltage simulated fault.

What is claimed is:

1. Power transmission control system comprising in combination:
   circuit means for coupling to a power transmission line for producing a line signal corresponding to actual power transmission, said circuit means including sensing means responsive to deviations in power transmission indicative of a potential fault condition to produce a control signal;
   fault simulation means for producing a reference signal corresponding to a power transmission fault condition in response to said control signal indicating detection of a potential fault condition by said sensing means;
   circuit means for comparing said simulated fault reference signal and said line signal corresponding to actual power transmission to produce a fault signal in response to deviations beyond the reference signal, said comparison being made over a short time period to produce said fault signal prior to excessive power dissipation in a fault condition so that said fault signal can be connected for interrupting power transmission prior to excessive power dissipation in response to said fault signal.

2. The power tranmission control system according to claim 1 in which said sensing means includes a threshold level detector providing a threshold level for detection of deviations beyond the threshold level in power transmission for indicating a potential fault condition.

3. The power transmission control system according to claim 1 in which ac power is transmitted and said fault simulation means comprises network for generating a reference signal in quadrature with power transmission to a substantially resistive load.

4. The power transmission control system according to claim 1 in which said circuit means for comparing comprises a differential amplifier and integrating means for comparing said reference and line signals over the short time period.

5. The power transmission control system according to claim 1 in which said circuit means for detecting a potential fault condition produces an output in approximately 50–100 microseconds and said system further includes means for interrupting power transmission includes circuit breakers responsive to the output to open the contacts thereof.

6. The power transmission control system according to claim 1 in which said short time period for comparison of line and reference signals is approximately on the order of 1 millisecond and the fault signal is produced before excessive power dissipation in a fault condition.

7. The power transmission control system according to claim 1 in which the control system is responsive to current deviations exceeding a predetermined threshold level in power transmission.

8. The power transmission control system of claim 1 wherein said fault simulation means comprises generating means for producing a signal in synchronization with the power in the power transmission system and means for shorting said generator means for producing the fault reference signal.

9. A fault detection system for detecting in an ac power transmission system a fault of sufficient severity to require the interruption of the ac system to protect components of the ac system, said fault detection system comprising:
  means for producing a line analog signal corresponding to line conditions in the ac system;
  a threshold detector connected to said line analog signal means for emitting a threshold signal when the line analog signal exceeds threshold value;
  a comparator, means for connecting said line analog signal to said comparator when said threshold detector detects a line analog signal above threshold;
  a generator for generating a simulated line wave in synchronism with the line analog wave;
  means for reducing the impedance on said generator upon threshold detection for producing a simulated fault signal and means for offsetting the simulated fault signal so that its wave centerline lies substantially on the wave centerline of the analog line signal so that said comparator compares the analog line signal and the offset simulated fault signal, so that said comparator emits a signal when the analog line signal exceeds the offset simulated fault signal.

10. The system of claim 9 wherein fault detector means is connected to receive the signal from the comparator and integrate the comparator signal over time and emit an interruption signal when the integrated signal exceeds a predetermined value.

11. The system of claim 9 further including means interconnecting said generator and said line to synchronize at said generator to said line and means to disconnect said generator from said line upon threshold detection.

12. The method of controlling ac electric power transmission to provide fault protection comprising the following steps:
  establishing a threshold for early detection of potential faults along a power transmission path;
  sensing the line signal in the transmission path and producing a threshold signal when it is beyond the established threshold;
  producing a reference wave in synchronism with the transmission path;
  reducing the impedance on the reference wave upon threshold signalling to produce a simulated fault wave signal representing the minimum fault value at which the path is to be interrupted;
  comparing the line signal and the simulated fault wave in a monitoring time period less than a time period for substantial build-up of power resulting from a fault condition to provide a fault signal for line signal beyond the simulated fault wave signal; and
  interrupting power transmission in response to the fault signal while maintaining the transmission path closed in the absence of a fault signal.

13. The method of controlling electric power transmission according to claim 12 in which a current threshold is established for line currents in the path and line current exceeding the threshold produces a threshold signal initiating simulation of fault current to provide the fault reference signal, comparing the line current and fault reference signals in said time period to produce a fault signal for line currents exceeding the reference signal over said time period, and interrupting the transmission path in response to the fault signal at the end of said time period.

14. The method of fault detection and control in an ac electric power transmission system comprising the following steps:
  producing a line analog signal of the system current;
  establishing a low threshold for early detection of potential faults in the power transmission system to produce a threshold signal indicating increase of the line analog signal above the threshold level on a transmission line during a minimum predetermined time interval;
  providing a fault simulation network for projecting a fault condition to provide a minimum fault reference signal for comparing with the line analog signal in response to the threshold signal;
  offsetting at least one of the signals so that the signal wave centerlines initially lie substantially together; and
  comparing the minimum fault reference and line analog signals during a predetermined minimum time period to produce a fault signal when the line analog signal exceeds the fault reference signal after the offsetting during the time period of comparison.

15. The method of fault detection and control in an electric power transmission system according to claim 14 in which said threshold consists in a current threshold which is established for detection of potential fault currents exceeding the current threshold during said time interval and power transmission is interrupted prior to excessive fault current build-up.

16. The method of fault detection and control in an electric power transmission system according to claim 15 in which an impedance is inserted to limit fault current.

17. The method of fault detection and control in an electric power transmission system according to claim 16 in which power transmission is limited in the transmission line by shunting the fault current through a bypass switch and interrupting the current through the switch to insert said impedance.

18. The method of fault detection and control of claim 14, further including the step of interrupting power transmission in an ac electric power transmission system during a fault condition in response to the fault signal.

* * * * *